(12) United States Patent
Kasch et al.

(10) Patent No.: US 6,423,246 B1
(45) Date of Patent: Jul. 23, 2002

(54) THERMOSTABLE PIGMENTS, FILMS AND EFFECT COATINGS, AND MIXTURES FOR THEIR PRODUCTION

(75) Inventors: Michael Kasch, Neuötting; Jürgen Küpfer, München; Franz-Heinrich Kreuzer, Martinsried, all of (DE)

(73) Assignee: Consortium fur Elektrochemische Industrie GmbH, Munich (DE)

( * ) Notice: Subject to any disclaimer, the term of this patent is extended or adjusted under 35 U.S.C. 154(b) by 0 days.

(21) Appl. No.: 09/546,040

(22) Filed: Apr. 10, 2000

(30) Foreign Application Priority Data

Apr. 15, 1999 (DE) .......................... 199 17 067
May 12, 1999 (DE) .......................... 199 22 158

(51) Int. Cl.[7] .................. C09K 19/52; C09K 19/38; C09D 5/00
(52) U.S. Cl. ................. 252/299.01; 106/493; 106/494; 106/499; 106/596
(58) Field of Search .................. 252/299.01, 299.4, 252/299.7; 428/1.1; 106/493, 494, 499, 506

(56) References Cited

U.S. PATENT DOCUMENTS

| | | | |
|---|---|---|---|
| 4,371,703 A | | 2/1983 | Stoss |
| 5,011,972 A | | 4/1991 | Meier et al. |
| 5,211,877 A | | 5/1993 | Andrejewski et al. |
| 5,362,315 A | | 11/1994 | Muller-Rees et al. |
| 5,654,471 A | | 8/1997 | Zahn et al. |
| 5,807,497 A | | 9/1998 | Gailberger et al. |
| 5,942,030 A | | 8/1999 | Schuhmacher et al. |
| 5,976,239 A | * | 11/1999 | Danenhauer et al. ....... 106/493 |
| 6,040,411 A | | 4/2000 | Haberie et al. |
| 6,107,447 A | | 8/2000 | Kreuder et al. |

FOREIGN PATENT DOCUMENTS

| | | |
|---|---|---|
| DE | 42 40 743 A1 | 6/1994 |
| DE | 44 42 831 A1 | 6/1995 |
| DE | 195 38 700 A1 | 4/1997 |
| DE | 196 02 848 A1 | 7/1997 |
| EP | 0 057 847 B1 | 6/1984 |
| EP | 0 358 074 B1 | 1/1994 |
| EP | 0 686 674 A1 | 12/1995 |
| EP | 0 749 466 B1 | 12/1996 |
| EP | 0 760 836 B1 | 3/1997 |
| EP | 0 887 398 A1 | 6/1998 |
| EP | 0 887 399 A1 | 6/1998 |
| WO | WO 95/24454 | 9/1995 |
| WO | WO 97/30136 | 8/1997 |

OTHER PUBLICATIONS

English Translation US 091 100 199 Corresponding To EP 0 877 398.

English Derwent Abstract [95–383808[50]] Corresponding To EP 0 686 674 A1.

Dirk J. Broer, Grietje N. Mol, "In–situ photopolymerization of oriented liquid–crystalline acrylates, 5a", Makromol, Chem. 192, 59–74 (1991).

L. Dulog, H. Schweiger, Farbe & Lack 1997, 30–44.

H.J. Lorkowski and F. Reuther "Uber die Herstellung Und Anisotrope Polymerisation Eines Flussigkristallinen Monomeren", Acta Chimica acadmiae Scientiarum Hungaricae, 423–434 (1977).

\* cited by examiner

*Primary Examiner*—Shean C. Wu
(74) *Attorney, Agent, or Firm*—Brooks & Kushman P.C.

(57) ABSTRACT

A mixture of crosslinkable liquid-crystalline substances having a chiral phase (LC mixture), containing polymerizable groups, where at least 90% of the polymerizable groups are part of molecules containing at least two polymerizable groups (crosslinker molecules), wherein from 3.2 to 15 mmol of polymerizable groups are present per g of LC mixture. The crosslinked pigments show little color shift in the presence of solvents or upon application to substrate different temperatures.

20 Claims, No Drawings

THERMOSTABLE PIGMENTS, FILMS AND EFFECT COATINGS, AND MIXTURES FOR THEIR PRODUCTION

TECHNICAL FIELD

The invention relates to thermostable pigments, films and effect coatings, and to mixtures for their production.

BACKGROUND ART

Materials having a liquid-crystalline structure with a chiral phase (LC materials) are known. The production of such materials from LC organosiloxanes is described, for example, in U.S. Pat. No. 5,211,877. Pigments containing aligned, three-dimensionally crosslinked substances having a liquid-crystalline structure with a chiral phase (LC pigments), their production and use are also known, for example from DE 42 407 43, which corresponds to U.S. Pat. No. 5,362,315.

One problem in the processing of LC materials, for example in surface finishes, is the varying color of the material depending on the application temperature. In paint systems employing conventional LC materials, for example those produced from LC organosiloxanes mentioned in U.S. Pat. No. 5,211,877 or the LC pigments disclosed in DE 42 407 43, different colors arise at processing temperatures of 130° C., the usual processing temperature in the OEM painting of vehicle bodies, than on processing at 80° C., the usual processing temperature for repair finishes.

This varying behavior of the LC pigment is generally caused by swelling of the pigment during production of paints and the de-swelling process during drying of these paints, i.e. by the action of solvents on the pigment. The swelling process, and the dissolving-out of uncrosslinked constituents from the pigment which may occur at the same time, modifies the structure of the pigment. Warming of the dried paint film results in pronounced relaxation of the helix of the cholesteric liquid crystal, i.e. the pitch of the helix is shortened. This results in a shortening of the central reflection wavelength, which is directly proportional to the pitch of the helix. The color of the pigment thus shifts toward shorter wavelengths. A clearly visually perceptible blue shift occurs. Depending on the selected processing temperature, i.e. the baking temperature of a paint containing LC pigments of this type, various degrees of relaxation of the helix in the pigments occur. This results in the undesired variation in hue with processing temperature.

EP 0 887 399 solves this problem by selecting crosslinkable LC organosiloxanes as pigment material which, after crosslinking, give LC pigments having maximum glass transition temperatures ($T_g$) of 80° C. and low uncrosslinked, extractable contents. Thus, complete and uniform relaxation of the helix is achieved at all temperatures above $T_g$, which means that the same color is always obtained at these temperatures. The property profile of these organosiloxanes is achieved by appropriate choice of flexible structural units, so-called spacers, in the LC monomers on which the pigments are based. Although these organosiloxanes modified with flexible structural units have quite good thermostability as LC pigments in the crosslinked state in the processing range 80° C.–130° C., they have, independently thereof, strong swelling especially processing window, of 80° C.–130° C., since incorporation of the spacers lowers the crosslinking density. LC pigments comprising mixtures in accordance with EP 0 887 399 exhibit strong interactions at room temperature with solvents usually used in paints, which results in strong swelling of the pigments and consequently a clearly visually perceptible red shift of the pigment color. In addition, the organosiloxanes modifications disclosed in EP 0 887 399 cause a significant increase in costs due to additional complex synthesis steps.

EP 0 887 398 discloses preparation of a system containing known LC pigments in which visually perceptible color differences at different processing temperatures are not evident, through selection of a suitable matrix. This system has the disadvantage that the user does not have a free choice of matrix for the LC pigments, but is subject to restrictions in selecting the paint components (vehicles and solvents).

EP 0 760 836, which corresponds to U.S. Pat. No. 5,807,497, discloses interference pigments comprising liquid-crystalline side-chain polymers made from low-molecular-weight, monofunctional or difunctional acrylates which are distinguished by higher color brightness, higher crosslinking density and better chemical resistance in conventional paints as well as simple production compared with the LC pigments disclosed hitherto. These LC pigments likewise have inadequate thermostability in the processing temperature range which is relevant for paint finishes of from about 80° C. to about 130° C. This inadequate thermostability is evident from shifts in the central reflection wavelengths of greater than 2 nm.

DISCLOSURE OF INVENTION

An object of the present invention is to provide a mixture of crosslinkable, liquid-crystalline substances having a chiral phase (LC mixture) which is suitable for the production of thermostable pigments, films and effect coatings.

BEST MODE FOR CARRYING OUT THE INVENTION

For the purposes of the present invention, an article, for example a pigment, a film, or an effect coating, is thermostable if it does not exhibit any visually perceptible color differences in a paint or plastic matrix over a temperature range of from 80° C. to 130° C.

A color difference is generally accepted by paint users as being visually imperceptible if the color difference $\Delta E^*$ in accordance with DIN 5033 and DIN 6174 between two paint samples produced at different temperatures is $\leq 2$ (L. Dulog, H. Schweiger, Farbe & Lack, 1997, 30–44). In order to achieve this aim in bright pigments (reflection >25%) in the green color region, in which the eye is particularly sensitive to color differences, experience has shown that it is necessary for the central reflection wavelengths to differ by $\leq 2$ nm in the paint samples processed at 80° C. and 130° C., respectively.

This object is achieved by an LC mixture containing polymerizable groups, where at least 90% of the polymerizable groups are part of molecules containing at least two polymerizable groups (crosslinker molecules), wherein from 3.2 to 15 mmol of polymerizable groups are present per g of LC mixture.

The LC mixture according to the invention preferably comprises, as substances to which the polymerizable groups are bonded, low-molecular-weight, oligomeric or polymeric substances or mixtures of these substances having a chiral phase. These chiral phases can also be thermotropic twisted nematic, smectic or discotic phases. They can also be substances having a thermotropic or lyotropic phase.

The LC mixture according to the invention particularly preferably consists of mixtures of compounds of the general formula $Y^1—A^1—M^1—A^2—Y^2$, in which $Y^1$ and $Y^2$ are identical or different and are polymerizable groups, such as, for example, acrylate, methacrylate, epoxide, isocyanate, hydroxyl, vinyl ether or vinyl ester radicals, and $A^1$ and $A^2$ are identical or different radicals of the general formula $C_nH_{2n}$, in which n is an integer from 0 to 20, and one or more methylene groups may be replaced by oxygen atoms, and $M^1$ has the general formula —$R^1$—$X^1$—$R^2$—$X^2$—$R^3$—$X^3$—$R^4$—, where $R^1$, $R^2$, $R^3$ and $R^4$ are identical or different divalent radicals selected from the group consisting of —O—, —COO—, —CONH—, —CO—, —S—, —C≡C—, —CH=CH—, —N=N— and —N=N(O)—, and $R^2$—$X^2$—$R^3$ or $R^2$—$X^2$ or $R^2$—$X^2$—$R^3$—$X^3$ can also be a C—C bond, and $X^1$, $X^2$ and $X^3$ are identical or different radicals selected from the group consisting of 1,4-phenylenes, 1,4-cyclohexylenes, arylenes, or heteroarylenes having 6 to 10 atoms in the heteroaryl ring which contain 1 to 3 heteroatoms from the group consisting of O, N and S and which are substituted by $B^1$ and/or $B^2$ and/or $B^3$, cycloalkylenes having 3 to 10 carbon atoms which are substituted by $B^1$ and/or $B^2$ and/or $B^3$, where $B^1$, $B^2$ and $B^3$ can be identical or different substituents selected from the group consisting of —H, $C_1$-$C_{20}$-alkyl, $C_1$-$C_{20}$-alkoxy, $C_1$-$C_{20}$-alkylthio, $C_1$-$C_{20}$-alkylcarbonyl, $C_1$-$C_{20}$-alkoxycarbonyl, $C_1$-$C_{20}$-alkylthiocarbonyl, —OH, —F, —Cl, —Br, —I, —CN, —$NO_2$, formyl, acetyl, and alkyl, alkoxy or alkylthio radicals having 1–20 carbon atoms which are interrupted by ether oxygen, thioether sulfur or ester groups, with chiral compounds of the general formula $V^1$—$A^1$—$W^1$—Z—$W^2$—$A^2$—$V^2$, in which $V^1$ and $V^2$ are identical or different and are an acrylate, methacrylate, epoxide, vinyl ether or vinyl ester radical, an isocyanate radical, $C_1$-$C_{20}$-alkyl, $C_1$-$C_{20}$-alkoxy, $C_1$-$C_{20}$-alkylthio, $C_1$-$C_{20}$-alkoxycarbonyl, $C_1$-$C_{20}$-alkylthiocarbonyl, —OH, —F, —Cl, —Br, —I, —CN, —$NO_2$, formyl, acetyl, and alkyl, alkoxy or alkylthio radicals having 1–20 carbon atoms which are interrupted by ether oxygen, thioether sulfur or ester groups, $A^1$ and $A^2$ are as defined above, and $W^1$ and $W^2$ have the general formula —$R^1$—$X^1$—$R^2$—$X^2$—$R^3$—, where $R^1$, $R^2$ and $R^3$ are as defined above and $R^2$ or $R^2$—$X^2$ may alternatively be a C—C bond, and $X^1$ and $X^2$ are as defined above, and Z is a divalent chiral radical from the group consisting of dianhydrohexitols, hexoses, pentoses, binaphthyl derivatives, biphenyl derivatives, tartaric acid derivatives and optically active glycols, where the concentration of the polymerizable groups of which at least 90% are on molecules containing at least two polymerizable groups in the mixture as a whole is from 3.2 to 15 mmol/g.

The LC mixture according to the invention preferably comprises from 70 to 99% by weight of compounds of the general formula $Y^1$—$A^1$—$M^1$—$A^2$—$Y^2$ defined above and from 1 to 30% by weight of compounds of the general formula $V^1$—$A^1$—$W^1$—Z—$W^2$—$A^2$—$V^2$ defined above, where the concentration of the polymerizable groups of which at least 90% are on molecules containing at least two polymerizable groups in the mixture as a whole is from 3.2 to 15 mmol/g.

Depending on the color setting, particular preference is given to mixtures comprising 90–95% by weight of the compounds of the general formula $Y^1$—$A^1$—$M^1$—$A^2$—$Y^2$ and 5–10% by weight of compounds of the general formula $V^1$—$A^1$—$W^1$—Z—$W^2$—$A^2$—$V^2$, where the concentration of the polymerizable groups of which at least 90% are on molecules containing at least two polymerizable groups in the mixture as a whole is from 3.2 to 15 mmol/g.

In a particularly simple embodiment, the LC mixture according to the invention is a low-molecular-weight nematic, crosslinkable, unsubstituted hydroquinone dibenzoate derivative having an average molecular weight of 450–800 g/mol, preferably 460–625 g/mol, and/or a hydroquinone monobenzoate derivative having an averaged molecular weight of 200–400 g/mol, preferably 220–300 g/mol, in combination with a chiral compound having an averaged molecular weight of from 500 to 1000, preferably from 500 to 700 g/mol, where the average molecular weight of the mixture as a whole does not exceed 625 g/mol.

The unsubstituted hydroquinone dibenzoate derivatives and hydroquinone monobenzoate derivatives preferably themselves have a large liquid-crystalline phase width of 80° C., preferably with a clearing point (Tc) of 150° C. Mixture components having non-liquid-crystalline properties should not reduce the liquid-crystalline phase width of the mixture as a whole to less than 30° C. The mixtures themselves may also have monotropic liquid-crystalline properties.

It is a further object of the present invention to provide highly crosslinked, thermostable LC films having a chiral phase and LC pigments having a chiral phase which, when converted into paint systems and other polymeric matrixes, for example liquid plastics, have central reflection wavelength differences of ≦2 nm over the usual processing temperature range of from 80° C. to 130° C., and exhibit a reduced interaction with solvents compared with known LC pigments at temperatures below this processing temperature range, in particular at room temperature. The reduced interaction is preferably evident in the form of reduced swelling and thus reduced red shift of the inherent color. These and other objects are achieved by LC films and LC pigments consisting of crosslinked LC mixtures according to the invention.

In order to produce the LC films and pigments of increased thermostability according to the invention, known low-molecular-weight, difunctional monomers of high equivalent weight are unsuitable. Although low-molecular-weight monofunctional or difunctional monomers of this type, as disclosed, for example in EP 0 749 466 or EP 0 760 836, predominantly have two polymerizable units for use in chiral nematic mixtures, their molecular weight is large in relation to the number of polymerizable units. For example, at an average molecular weight of the individual components of 650 g/mol and with two polymerizable units per molecule, the mixture contains only a maximum of 3.08 mmol of polymerizable units per gram. Although polymerization of such mixtures gives virtually complete crosslinking, the number of network intersections per volume unit, i.e. the crosslinking density, is too low to suppress solvent interaction of the crosslinked polymer sufficiently to ensure thermostability and consequently color constancy.

Only an LC mixture according to the invention enables the production of thermostable LC pigments which have central reflection wavelength differences of ≦2 nm over a processing temperature range of 80° C.–130° C. in a matrix such as a conventional polymeric vehicle.

LC films and LC pigments of this type can be produced from an LC mixture according to the invention by processes known from the prior art, as described, inter alia, in the specifications already mentioned. One process for the production of an LC film according to the invention comprises applying an LC mixture according to the invention in the liquid-crystalline state to a smooth substrate, aligning the LC mixture, three-dimensionally crosslinking the LC mixture by polymerization, and detaching the film from the substrate. The LC mixture according to the invention is preferably applied to the smooth surface in a thickness of from 3 to 15 μm, more preferably from 3 to 6 μm. The alignment can be carried out, for example, by shearing, employing a knife coater or roller.

The polymerization of the aligned LC material can be carried out in a manner known per se, for example by means of free radicals using commercially available thermal initiators, by means of electron beams or using UV light in combination with commercially available photoinitiators, or alternatively by addition or condensation reactions.

The crosslinking of the mixtures according to the invention in the chiral structural state is carried out by means of a polymerization reaction, which proceeds, depending on the type of polymerizable, polycondensable or addition polymerizable groups, in the form of a free-radical, ionic or metal-catalyzed polymerization or as a polycondensation reaction or as a polyaddition reaction.

The initiation of free-radical polymerization can be carried out thermally by means of corresponding initiators, by UV radiation using commercially available photoinitiators, or by high-energy radiation such as electron beams. An advantage of thermal free-radical polymerization or polymerization via electron beam curing is that light stabilizers, such as UV absorbers (UVAs) or free-radical scavengers (HALS) can also be added to the polymerizable mixture in order to stabilize the resultant pigments or films against UV light, for example for outside applications, without impairment of the polymerization conversion occurring, as is the case in UV curing, owing to the shielding of the photoinitiator by a UVA. There is consequently no reduction in the crosslinking density.

If the curing of the LC films is carried out by means of peroxides or electron beams, the LC mixture according to the invention preferably contains commercially available light stabilizers, such as UV absorbers or free-radical scavengers in a total concentration of from 0.5 to 5% by weight.

Besides the light stabilizers, the mixtures according to the invention can contain further conventional additives for oxidation inhibition, polymerization inhibition or additives for improving rheological properties. In addition, absorbing fillers, such as pigments or carbon black, and fluorescent dyes or pigments may also be present.

The invention furthermore relates to a process for the production of LC pigments according to the invention. A process of this type comprises comminuting an LC film according to the invention to give platelet-shaped particles, preferably platelet-shaped particles having a diameter of from 5 to 100 μm, more preferably from 10 to 50 μm. Pigments having these geometrical dimensions are preferred pigments. They can be separated by a particle size-selective method.

The invention thus also relates to coating compositions, in particular, paint compositions, comprising LC pigments or LC films according to the invention. The LC pigments or films prepared according to the invention are suitable for incorporation into any desired coating compositions, and are particularly suitable for incorporation into paints for vehicle bodies.

The invention furthermore relates to articles, in particular vehicle bodies, coated with coating compositions according to the invention.

The invention is explained in greater detail below with reference to examples. A comparison of the LC pigments made from LC mixtures in accordance with Examples 6 to 10 with LC pigments made from LC mixtures according to Comparative Examples 1, 2 and 3 shows that the LC mixtures according to the invention give thermostable LC films and LC pigments having central reflection wavelength differences of $\leq 2$ nm over the entire processing temperature range of from 80 to 130° C. As can be seen from Example 11, the pigments according to the invention exhibit only slight interactions with solvents, even at room temperature.

EXAMPLE 1

Preparation of 4-(4'-Acryloxybutoxy)benzoic Acid a) 276.6 g of 4-chlorobutyl acetate (1.8 mol) were added to a solution of 249 g of ethyl 4-hydroxybenzoate (1.5 mol), 3 g of potassium iodide (0.018 mol) and 248 g of potassium carbonate (1.8 mol) in 2 l of DMF, and the mixture was stirred at 90° C. for 11 hours. The reaction mixture was poured into 5 l of ice-water, and the precipitate was filtered off with suction and washed with 4 l of ice-water. The crude product was dissolved in 3 l of ethanol, potassium hydroxide (400 g) was added, and the mixture was refluxed for 3 hours. The reaction mixture was poured into 6 l of ice-water and acidified using concentrated hydrochloric acid, and the precipitate was filtered off. The precipitate was washed with water until neutral and then dried, giving 282.1 g of 4-(4'-hydroxybutoxy)benzoic acid (yield 89%). b) A solution of 282 g of 4-(4'-hydroxybutoxy)benzoic acid (1.34 mol), 230 ml of freshly distilled acrylic acid (3.35 mol), 0.3 g of 2,6-di-tert-butyl-4-(dimethylaminomethylene)phenol (Ethanox® 703) and 23.7 g of p-toluenesulfonic acid in 1.1 liter of 1,1,1-trichloroethane was refluxed for 10 hours on a water separator. The reaction mixture was cooled to 60° C.–70° C. and stirred into 2.5 l of petroleum ether, and the precipitate was filtered off. After washing with petroleum ether, the precipitate was dried for 24 hours at room temperature under reduced pressure, giving 223.7 g of 4-(4'-acryloxybutoxy)benzoic acid (yield 60%).

EXAMPLE 2

Preparation of a Chiral Compound (2-[4'-(4'-acryloylbutoxy)benzoyl]-5-anisoylisosorbide)

a) 902.6 g of 2-acetylisosorbide (4.8 mol), prepared as described in EP 057 847, Example 1, were dissolved in 1.7 l of xylene, and a solution of 900 g of anisoyl chloride (5.3 mol) in 200 ml of xylene was added. The mixture was refluxed for 5 hours. When conversion was complete, the mixture was cooled to room temperature, during which the product precipitated. The product was filtered off with suction, and the filter cake washed with 600 ml of petroleum ether and dried in air, giving 1278.8 g of 2-acetyl-5-anisoylisosorbide (yield 83%).

b) 639 g of 2-acetyl-5-anisoylisosorbide (1.98 mol) were introduced into 2.5 l of methanol, and 269 ml of aqueous 25% strength ammonia solution (3.96 mol) were added. The solution was stirred at 55° C. for 3 hours. The solvent and the excess ammonia were evaporated off under reduced pressure, and the residue was dried under reduced pressure. The reaction of 5-anisoylisosorbide was carried out without further purification.

c) 232.35 g (0.83 mol) of the resultant 5-anisoylisosorbide, 230.0 g (0.87 mol) of 4-(4'-acryloylbutoxy)benzoic acid (prepared as described in Example 1), 30 mg of 2,6-di-t-butyl-4-(dimethylaminomethyl)phenol (Ethanox® 703, Ethyl Corp., Baton Rouge, La. 70801) and 5.5 g of dimethylaminopyridine were dissolved in 1 l of methylene chloride and cooled to 6° C. 196.7 g (0.95 mol) of DCC were added at this temperature, and the mixture was stirred for 1 hour and subsequently warmed to room temperature. Precipitated dicyclohexylurea was filtered off, the solvent was stripped off under reduced pressure, and the residue was recrystallized from 1.5 l of isopropanol. The crystals were washed again with 1 l of isopropanol, giving 357 g of 2-[4'-(4'-acryloylbutoxy)benzoyl]-5-anisoylisosorbide (yield 82%) having a melting point of 82° C.

EXAMPLE 3

Preparation of a Chiral Compound 2-[4-(acryloyloxy)benzoyl]-5-(4-methoxybenzoyl)isosorbide 13.3 g of 5-anisoylisosorbide (47.5 mmol), obtainable as described in Example 1b, and 10.6 g of triethylamine (104.5 mmol) were dissolved in 70 ml of toluene. A solution of 10 g (47.5 mmol) of 4-(acryloyloxy)benzoyl chloride (prepared as described in Lorkowski, H. J.; Reuther, F., *Acta Chim. Acad. Sci. Hung.*, 1977, 95, 423–34) in 10 ml of toluene was added dropwise at 80° C. The mixture was stirred at 80° C. for 2 hours, and then 70 ml of 1N hydrochloric acid were added at room temperature, the organic phase was washed with water (2×50 ml) and saturated sodium hydrogencarbonate solution (50 ml), dried over sodium sulfate, and the solvent was removed under reduced pressure. The syrup obtained was stirred with 75 ml of isopropanol. Filtration gave 2-[4-(acryloyloxy)benzoyl]-5-(4-methoxybenzoyl)isosorbide having a melting point of 111° C. in a yield of 11.7 g (54% of theory).

EXAMPLE 4

Preparation of a Chiral Compound di-2,5-[4-(acryloyloxy)benzoyl]isosorbide 20.0 g of isosorbide (137 mmol) and 73.2 g of triethylamine (723 mmol) were dissolved in 120 ml of toluene. The solution of 60.5 g (287 mmol) of 4-(acryloyloxy)benzoyl chloride (prepared as described in Lorkowski, H. J.; Reuther, F., *Acta Chim. Acad. Sci. Hung.*, 1977, 95, 423–34) in 60 ml of toluene was added dropwise at 80° C. The mixture was stirred at 80° C. for 2 hours, and then 80 ml of 10% strength hydrochloric acid were added at room temperature, the organic phase was washed with water (2×80 ml), 10% strength sodium hydrogencarbonate solution (80 ml), dried over sodium sulfate, and the solvent removed under reduced pressure to a toluene content of about 20% by weight. 220 ml of ethanol and 200 ml of cyclohexane were added to the resultant syrup, and the mixture was warmed to 80° C. with stirring. Cooling and filtration gave di-2,5-[4-(acryloyloxy)benzoyl]isosorbide having a melting point of 115–115° C. in a yield of 45.9 g (68% of theory).

EXAMPLE 5

Preparation of a Difunctional Component 4-acryloyloxyphenyl 4-(4-acryloyloxybutoxy)benzoate 84.4 g (0.3 mol) of 4-(4-acryloyloxybutoxy)benzoyl chloride were dissolved in toluene, and the solution was added dropwise at room temperature with stirring to a mixture of 49.2 g (0.3 mol) of 4-hydroxyphenyl acrylate, 40.0 g of triethylamine (0.4 mol), 300 ml of toluene and 1 g of 2,6-di-tert-butyl-4-methylphenol over the course of 45 minutes. The mixture was then heated at 50° C. for 30 minutes, the resultant amine hydrochloride was filtered off while the mixture was still warm, and 800 ml of petroleum ether were stirred into the filtrate. The target product precipitated out during this operation. After cooling to 5° C., the product was filtered off, taken up in ethyl acetate at 40° C. and extracted three times with water. The organic phase was dried and the solvent evaporated, and the residue was recrystallized from 200 ml of isopropanol, giving 100 g of target product (82% yield). The melting range was from 103 to 105° C.

The 4-hydroxyphenyl acrylate required can be obtained by selective monocleavage of hydroquinone bisacrylate using sodium methoxide analogously to DE 44 42 831 (corresponds to U.S. Pat. No. 5,654,471) in a yield of 91%. The monoacrylate is liquid at room temperature. The acid component to the above ester, 4-(4-acryloyloxybutoxy)benzoic acid, can be obtained by reacting 4-chlorobutyl acetate with methyl 4-hydroxybenzoate, hydrolyzing the resultant alkylated methyl ester to give free 4-(4-hydroxybutoxy)benzoic acid, and esterifying the latter on the hydroxybutoxy radical using acrylic acid. This acid melts at 124° C. (yield 70%) and can be converted into the acid chloride by conventional reaction with thionyl chloride.

EXAMPLE 6

Green Three-component Liquid-crystal Mixture According to the Invention 23.93 g of hydroquinone bis[4-(4-acryloylbutoxy)benzoate] (prepared as described by Broer, D. J.; Mol, G. N.; Challa, G., *Makromol. Chem.*, 1991, 192, 59), 6.6 g of 4-acryloyloxyphenyl 4-(4-acryloyloxybutoxy)benzoate as described in Example 5 and 2.81 g of 2-[4'-(4'-acryloylbutoxy)benzoyl]-5-anisoylisosorbide as described in Example 2 were weighed out together with 10 mg of triethylamine and 0.09 g of 2,6-di-tert-butyl-4-(dimethylaminomethylene)phenol (Ethanox® 703, Ethyl Corp., Baton Rouge, La. 70801) and 0.33 g of the photoinitiator Irgacure® 819 (Ciba Spezialitätenchemie GmbH, Lampertsheim) and dissolved in toluene at 70° C. to give an approximately 25 weight percent solution. The mixture was subsequently filtered through a 1.5 cm thick layer of Celite® (Manville Corp., Denver, USA)/Tonsil® (Süidchemie A G, Munich) (95/5). The solvent was removed in a high vacuum (residual solvent content of <0.1% by weight). The resultant liquid-crystalline mixture has a clearing point from cholesteric to isotropic of 125° C. The viscosity is about 200 mPas at 90° C. The concentration of polymerizable groups in this mixture is 3.50 mmol/g without taking into account the photoinitiator. An LC film produced therefrom at 93° C. as described in Example 15, has a central reflection wavelength of 543 nm.

EXAMPLE 7

Red Three-component Liquid-crystal Mixture According to the Invention

Analogously to Example 6, a red liquid-crystalline mixture having a clearing point from cholesteric to isotropic of 130° C. was prepared from 24.09 g of hydroquinone bis[4-(4-acryloylbutoxy)benzoate] (prepared as described by Broer, D. J.; Mol, G. N.; Challa, G., *Makromol. Chem.*, 1991, 192, 59), 6.6 g of 4-acryloyloxyphenyl 4-(4-acryloyloxybutoxy)benzoate as described in Example 5 and 2.32 g of 2-[4'-(4'-acryloylbutoxy)benzoyl]-5-anisoylisosorbide as described in Example 2 as well as 10 mg of triethylamine and 0.09 g of 2,6-di-tert-butyl-4-(dimethylaminomethylene)phenol (Ethanox® 703, Ethyl Corp., Baton Rouge, La. 70801) and 0.33 g of the photoinitiator Irgacure® 819. The viscosity of this mixture is about 108 mPas at 90° C. The concentration of polymerizable groups in this mixture is 3.52 mmol/g without taking into account the photoinitiator. An LC film produced therefrom at 93° C. as described in Example 15, has a central reflection wavelength of 637 nm.

EXAMPLE 8

Green Three-component Liquid-crystalline Mixture According to the Invention

Analogously to Example 6, a green liquid-crystalline mixture having a clearing point from cholesteric to isotropic of 140° C. was prepared from 15.84 g of hydroquinone bis[4-(4-acryloylbutoxy)benzoate] (obtainable as described by Broer, D. J.; Mol, G. N.; Challa, G., *Makromol. Chem.*, 1991, 192, 59), 4.4 g of 4-acryloyloxyphenyl 4-(4-acryloyloxy)benzoate obtainable as described in EP 0358074, Example 1, and 1.76 g of 2-[4'-(4'-acryloylbutoxy)benzoyl]-5-anisoylisosorbide as described in Example 2 as well as 10 mg of triethylamine and 0.09 g of 2,6-di-tert-butyl-4-(dimethylaminomethylene)phenol (Ethanox® 703, Ethyl Corp., Baton Rouge, La. 70801) and 0.22 g of the photoinitiator Irgacure® 819. The viscosity of this mixture is about 112 mPas at 90° C. The concentration of polymerizable groups in this mixture is 3.78 mmol/g without taking into account the photoinitiator. An LC film produced therefrom at 95° C. as described in Example 15, has a central reflection wavelength of 530 nm.

EXAMPLE 9

Blue-green Two-component Liquid-crystalline Mixture According to the Invention 50.55 g of hydroquinone bis[4-(4-acryloylbutoxy)benzoate], obtainable as described by Broer, D. J.; Mol, G. N.; Challa, G., *Makromol. Chem.*, 1991, 192, 59, 0.55 g of the photoinitiator Irgacure® 819, 17 mg of triethylamine and 0.09 g of 2,6-di-tert-butyl-4-(dimethylaminomethylene)phenol (Ethanox® 703, Ethyl Corp., Baton Rouge, La. 70801) and 29.81 g of a 14.93% strength toluene solution of 2-[4-(acryloyloxy)benzoyl]-5-(4-methoxybenzoyl)isosorbide (obtainable as described in Example 3) were weighed out. The mixture was homogenized at an oil-bath temperature of 150° C. using a precision glass stirrer until a clear solution was formed. By careful application of a vacuum, the small proportion of toluene was stripped off. The mixture was stirred at a reduced pressure of 1 mbar until the mixture had melted isotropically (about 10 minutes).

The mixture was immediately cooled until the material temperature was about 80–90° C. The mixture has a clearing point from cholesteric to isotropic of 142° C. and a viscosity of about 200 mPas at 80° C. The concentration of polymerizable groups in this mixture is 3.21 mmol/g without taking into account the photoinitiator. An LC film produced therefrom at 95° C. as described in Example 15, has a central reflection wavelength of 515 nm.

EXAMPLE 10

Blue-green Two-component Liquid-crystalline Mixture According to the Invention 92.3 g of hydroquinone bis[4-(4-acryloylbutoxy)benzoate] (obtainable as described by Broer, D. J.; Mol, G. N.; Challa, G., *Makromol. Chem.*, 1991, 192, 59), 7.7 g of 2,5-bis[4-(acryloyloxy)benzoyl]isosorbide (obtainable as described in Example 4), 1.00 g of the photoinitiator Irgacure® 819 and 0.20 g of 2,6-di-tert-butyl4-(dimethylaminomethylene)phenol (Ethanox® 703, Ethyl Corp., Baton Rouge, La. 70801) were weighed out. The mixture was homogenized at an oil-bath temperature of 150° C. using a precision glass stirrer until a clear solution was formed.

The mixture has a clearing point of 146° C. and a viscosity of about 200 mPas at 100° C. The concentration of polymerizable groups in this mixture is 3.37 mmol/g without taking into account the photoinitiator. An LC film produced therefrom at 100° C. as described in Example 15, has a central reflection wavelength of 476 nm.

COMPARATIVE EXAMPLE 1

Green Liquid-crystalline Mixture Corresponding to DE 4240743, Example 4A

A green liquid-crystalline mixture was prepared as described in Example 4A of DE 4240743. This liquid-crystalline mixture contains 1.67 mmol/g of polymerizable groups without taking into account the photoinitiator. An LC film produced therefrom at 90° as described in Example 15, has a central reflection wavelength of 516 nm.

COMPARATIVE EXAMPLE 2

Green Liquid-crystal Mixture Corresponding to EP 0749466 (WO 95/24454)

A green liquid-crystalline mixture was prepared analogously to the general procedure for the preparation of cholesteric mixtures in EP 0749466 from 11.25% by weight of each of components K6, K7, K10 and K11 from Example 88, Mixture 36, and components K1, K2, K4 and K5 from Example 92, Mixture 40, and 10% by weight of the chiral component K10 from Example 78, Mixture 26, with addition of 0.8% by weight of the photoinitiator Irgacure® 907 (Ciba Spezialitätenchemie GmbH, Lampertsheim). The mixture has a clearing point from cholesteric to isotropic of 92° C. and contains 3.04 mmol/g of polymerizable groups without taking into account the photoinitiator. An LC film produced therefrom at 50° C. as described in Example 15, has a central reflection wavelength of 545 nm.

COMPARATIVE EXAMPLE 3

Green Liquid-crystal Mixture Corresponding to EP 0 760 836

A green liquid-crystalline mixture was prepared analogously to the general procedure for the preparation of cholesteric mixtures in EP 0760836 from 58% by weight of 1,4-(2-methyl)phenyl di[4-(6-acryloyloxy)hexyloxy]benzoate as nematic component and 42% by weight of cholesteryl 3,5-di-(4-acryloyloxybutoxy)-benzoate as chiral component. 1% by weight of the photoinitiator Irgacure® 819 (Ciba Spezialitätenchemie GmbH, Lampertsheim) and 2000 ppm of 2,6-di-tert-butyl-4-(dimethylaminomethylene)phenol (Ethanox® 703, Ethyl Corp., Baton Rouge, La. 70801) as stabilizer were added to the mixture. The mixture has a clearing point from cholesteric to isotropic of 61° C. It contains 2.79 mmol/g of polymerizable groups without taking into account the photoinitiator. An LC film produced therefrom at 42° C. as described in Example 15, has a central reflection wavelength of 522 nm.

EXAMPLE 11

Interaction of Pigments with Toluene at Room Temperature

The base of a 1 cm cell was covered with pigments having a chiral structure, and the cell was filled with toluene. After one hour, the pigments were shaken in the cell and then allowed to sink back to the base. The central reflection wavelength of the swollen pigments was determined using a reflection attachment on a Perkin-Elmer Lambda 19 UV/VIS spectrometer and compared with the central reflection wavelength, measured on the same instrument, of the corresponding LC film obtained from the pigment.

| Pigment type | Central reflection wavelength of the corresponding film [nm] | Central reflection wavelength of the pigment in toluene/1 h [nm] | Wavelength difference (red shift/ swelling) [nm] |
|---|---|---|---|
| LC pigment analogous to EP-A-0887399, Example 15 B** | 540 | 710 | 170 |
| Pigment according to the invention as per Example 9 | 505 | 506 | 1 |

EXAMPLE 12

Production of the Colored LC Films

The monomer mixtures of crosslinkable nematic component(s) and chiral polymerizable component listed in Examples 6 to 10 and the Comparative Examples were aligned by the procedure described in U.S. Pat. No. 5,362,315 (corresponds to EP 0 686 674) by application in the cholesteric phase by knife coater to a PET support film at the respective temperature given in the example, to give layers with a thickness of 3–10 $\mu$m, subsequently cured by UV light with a UV$_A$ dose of about 300–600 mJcm$^{-2}$. LC films having the respective color mentioned in the Examples when viewed orthogonally were obtained. At viewing angles differing from orthogonal, these LC films exhibited a color in each case shifted to shorter wavelengths.

EXAMPLE 13

Production of the LC pigments

The photocrosslinked, colored LC film was detached from the support film, giving rough LC lumps. These lumps were subsequently comminuted using an air-jet mill (Retsch). The ground material obtained was sieved, and a sieve fraction having a mean size of about 30 $\mu$m was used for further processing.

EXAMPLE 14

Production of a Paint According to the Invention

The LC pigments obtained in accordance with Example 13 were mixed with a varnish in the ratio 1:9 parts by weight. The varnish used was a Herberts "Standox" two-component clear coat, to which the curing agent was added just before processing, or a conventional Herberts acrylate-melamine resin vehicle system for automotive refinishing. The viscosity was adjusted to an efflux time of 80 seconds from a DIN 4 flow cup using a diluent.

EXAMPLE 15

Thermostable LC Effect Coatings on Glazed Cardboard

The mixture of pigment and vehicle as described in Example 14 was left to stand overnight and applied to black glazed cardboard using a film applicator (Erichsen, D-58675 Hemer) at a gap width of 180 $\mu$m and an application rate of 10 mm/sec. After a drying time of 10 minutes at room temperature, respective samples were heated at 80° C. for 1 hour or at 130° C. for 1 hour. The reflection spectra of the paint samples baked at the various temperatures were determined using a CM 508/d calorimeter from Minolta (D-22923 Ahrensburg). The comparative materials used were pigments comprising LC mixtures prepared as described in Comparative Examples 1 to 3 and correspondingly applied and characterized (concentration of polymerizable groups <3.2 mmol/g).

| Pigments from Example Mixture | Polymerizable groups [mmol/g] | Reflection wavelength [nm] | Reflection wavelength difference (nm) [(1 h/80° C.)/ (1 h/130° C.)] |
|---|---|---|---|
| 6 | 3.50 | 543 | 1 |
| 7 | 3.52 | 637 | 1 |
| 8 | 3.78 | 530 | 2 |
| 9 | 3.21 | 515 | <1 |
| 10 | 3.37 | 476 | <1 |
| 1 (comparative) | 1.67 | 516 | 11 |
| 2 (comparative) | 3.04 | 545 | 3 |
| 3 (comparative) | 2.79 | 522 | 4 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An LC mixture comprising crosslinkable liquid-crystalline substances having a chiral phase and containing polymerizable groups, wherein at least 90% of the polymerizable groups of said crosslinkable liquid-crystalline substances are part of crosslinker molecules containing at least two polymerizable groups, and wherein from 3.2 to 15 mmol of polymerizable groups are present per g of said LC mixture.

2. The LC mixture of claim 1, wherein the substances having a chiral phase containing polymerizable groups are low-molecular-weight, oligomeric or polymeric substances or mixtures of these substances.

3. The LC mixture of claim 1, comprising:
   a) a single compound or mixtures of compounds of the general formula $Y^1$—$A^1$—$M^1$—$A^2$—$Y^2$, in which $Y^1$ and $Y^2$ are identical or different polymerizable groups; $A^1$ and $A^2$ are identical or different radicals of the general formula $C_nH_{2n}$, in which n is an integer from 0 to 20, and one or more methylene groups may be replaced by oxygen atoms; $M^1$ has the general formula —$R^1$—$X^1$—$R^2$—$X^2$—$R^3$—$X^3$—$R^4$—, where $R^1$, $R^2$, $R^3$ and $R^4$ are identical or different divalent radicals selected from the group consisting of —O—, —COO—, —CONH—, —CO—, —S—, —C≡C—, —CH=CH—, —N=N— and —N=N(O)—, wherein $R^2$—$X^2$—$R^3$ or $R^2$—$X^2$ or $R^2$—$X^2$—$R^3$—$X^3$ can be a C—C bond, and $X^1$, $X^2$ and $X^3$ are identical or different radicals selected from the group consisting of 1,4-phenylenes, 1,4-cyclohexylenes, arylenes, and heteroarylenes having 6 to 10 atoms in a heteroaryl ring containing 1 to 3 heteroatoms from the group consisting of O, N and S, optionally substituted by one or more of $B^1$, $B^2$ or $B^3$, and cycloalkylenes having 3 to 10 carbon atoms which are substituted by one or more of $B^1$, $B^2$, or $B^3$, where $B^1$, $B^2$ and $B^3$ are identical or different substituents selected from the group consisting of —H, $C_1$–$C_{20}$-alkyl, $C_1$–$C_{20}$-alkoxy, $C_1$–$C_{20}$-alkylthio, $C_1$–$C_{20}$-alkylcarbonyl, $C_1$–$C_{20}$-alkoxycarbonyl, $C_1$–$C_{20}$-alkylthiocarbonyl, —OH, —F, —Cl, —Br, —I, —CN, —NO$_2$, formyl, acetyl, and alkyl, alkoxy or alkylthio radicals having 1–20 carbon atoms which are optionally interrupted by ether oxygen, thioether sulfur or ester groups, with b) chiral compounds of the general formula $V^1$—$A^1$—$W^1$—Z—$W^2$—$A^2$—$V^2$, in which $V^1$ and $V^2$ are identical or different and are an acrylate, methacrylate, epoxide, vinyl ether or vinyl ester radical, an isocyanate radical, $C_1$–$C_{20}$-alkyl, $C_1$–$C_{20}$-alkoxy, $C_1$–$C_{20}$-alkylthio, $C_1$–$C_{20}$-alkoxycarbonyl, $C_1$–$C_{20}$-alkylthiocarbonyl, —OH, —F, —Cl, —Br, —I, —CN, —NO$_2$, formyl, acetyl, and alkyl, alkoxy or alkylthio radical having 1–20 carbon atoms which are optionally interrupted by ether oxygen, thioether sulfur or ester groups, $A^1$ and $A^2$ are as defined above, and $W^1$ and $W^2$ have the general formula —$R^1$—$X^1$—$R^2$—$X^2$—$R^3$—, where $R^1$, $R^2$ and $R^3$ are as defined above and $R^2$ or $R^2$—$X^2$ may alternatively be a C—C bond, and $X^1$ and $X^2$ are as defined above, and Z is a divalent chiral radical from the group consisting of dianhydrohexitols, hexoses, pentoses, binaphthyl derivatives, biphenyl derivatives, tartaric acid derivatives and optically active glycols, wherein the concentration of the polymerizable groups, of which at least 90% are on crosslinker molecules containing at least two polymerizable groups, in the mixture as a whole is from 3.2 to 15 mmol/g.

4. The LC mixture of claim 2, comprising:

a) a single compound or mixtures of compounds of the general formula $Y^1$—$A^1$—$M^1$—$A^2$—$Y^2$, in which $Y^1$ and $Y^2$ are identical or different polymerizable groups; $A^1$ and $A^2$ are identical or different radicals of the general formula $C_nH_{2n}$, in which n is an integer from 0 to 20, and one or more methylene groups may be replaced by oxygen atoms; $M^1$ has the general formula —$R^1$—$X^1$—$R^2$—$X^2$—$R^3$—$X^3$—$R^4$—, where $R^1$, $R^2$, $R^3$ and $R^4$ are identical or different divalent radicals selected from the group consisting of —O—, —COO—, —CONH—, —CO—, —S—, —C≡C—, —CH=CH—, —N=N— and —N=N(O)—, wherein $R^2$—$X^2$—$R^3$ or $R^2$—$X^2$ or $R^2$—$X^2$—$R^3$—$X^3$ can be a C—C bond, and $X^1$, $X^2$ and $X^3$ are identical or different radicals selected from the group consisting of 1,4-phenylenes, 1,4-cyclohexylenes, arylenes, and heteroarylenes having 6 to 10 atoms in a heteroaryl ring containing 1 to 3 heteroatoms from the group consisting of O, N and S, optionally substituted by one or more of $B^1$, $B^2$ or $B^3$, and cycloalkylenes having 3 to 10 carbon atoms which are substituted by one or more of $B^1$, $B^2$, or $B^3$, where $B^1$, $B^2$ and $B^3$ are identical or different substituents selected from the group consisting of —H, $C_1$–$C_{20}$-alkyl, $C_1$–$C_{20}$-alkoxy, $C_1$–$C_{20}$-alkylthio, $C_1$–$C_{20}$-alkylcarbonyl, $C_1$–$C_{20}$-alkoxycarbonyl, $C_1$–$C_{20}$-alkylthiocarbonyl, —OH, —F, —Cl, —Br, —I, —CN, —NO$_2$, formyl, acetyl, and alkyl, alkoxy or alkylthio radicals having 1–20 carbon atoms which are optionally interrupted by ether oxygen, thioether sulfur or ester groups, with b) chiral compounds of the general formula $V^1$—$A^1$—$W^1$—Z—$W^2$—$A^2$—$V^2$, in which $V^1$ and $V^2$ are identical or different and are an acrylate, methacrylate, epoxide, vinyl ether or vinyl ester radical, an isocyanate radical, $C_1$–$C_{20}$-alkyl, $C_1$–$C_{20}$-alkoxy, $C_1$–$C_{20}$-alkylthio, $C_1$–$C_{20}$-alkoxycarbonyl, $C_1$–$C_{20}$-alkylthiocarbonyl, —OH, —F, —Cl, —Br, —I, —CN, —NO$_2$, formyl, acetyl, and alkyl, alkoxy or alkylthio radical having 1–20 carbon atoms which are optionally interrupted by ether oxygen, thioether sulfur or ester groups, $A^1$ and $A^2$ are as defined above, and $W^1$ and $W^2$ have the general formula —$R^1$—$X^1$—$R^2$—$X^2$—$R^3$—, where $R^1$, $R^2$ and $R^3$ are as defined above and $R^2$ or $R^2$—$X^2$ may alternatively be a C—C bond, and $X^1$ and $X^2$ are as defined above, and Z is a divalent chiral radical from the group consisting of dianhydrohexitols, hexoses, pentoses, binaphthyl derivatives, biphenyl derivatives, tartaric acid derivatives and optically active glycols, wherein the concentration of the polymerizable groups, of which at least 90% are on crosslinker molecules containing at least two polymerizable groups, in the mixture as a whole is from 3.2 to 15 mmol/g.

5. The LC mixture of claim 3 wherein $Y^1$ and $Y^2$ individually are selected from the group consisting of acrylate, methacrylate, epoxide, isocyanate, hydroxyl, vinyl ether, and vinyl ester radicals.

6. The LC mixture of claim 4 wherein $Y^1$ and $Y^2$ individually are selected from the group consisting of acrylate, methacrylate, epoxide, isocyanate, hydroxyl, vinyl ether, and vinyl ester radicals.

7. The LC mixture of claim 3, which comprises from 70 to 99% by weight of compounds of the general formula $Y^1$—$A^1$—$M^1$—$A^2$—$Y^2$ and from 1 to 30% by weight of compounds of the general formula $V^1$—$A^1$—$W^1$—Z—$W^2$—$A^2$—$V^2$.

8. The LC mixture of claim 4, which comprises from 70 to 99% by weight of compounds of the general formula $Y^1$—$A^1$—$M^1$—$A^2$—$Y^2$ and from 1 to 30% by weight of compounds of the general formula $V^1$—$A^1$—$W^1$—Z—$W^2$—$A^2$—$V^2$.

9. An LC film or LC pigment comprising the crosslinked LC mixture of claim 1.

10. An LC film or LC pigment comprising the crosslinked LC mixture of claim 2.

11. An LC film or LC pigment comprising the crosslinked LC mixture of claim 3.

12. An LC film or LC pigment comprising the crosslinked LC mixture of claim 4.

13. An LC film or LC pigment comprising the crosslinked LC mixture of claim 5.

14. A process for the production of an LC film comprising applying an LC mixture as claimed in claim 1 in the liquid-crystalline state to a smooth substrate, aligning the LC mixture, three-dimensionally crosslinking the LC mixture, and detaching the film from the substrate.

15. A process for the production of an LC film comprising applying an LC mixture as claimed in claim 2 in the liquid-crystalline state to a smooth substrate, aligning the LC mixture, three-dimensionally crosslinking the LC mixture, and detaching the film from the substrate.

16. A process for the production of an LC film comprising applying an LC mixture as claimed in claim 3 in the liquid-crystalline state to a smooth substrate, aligning the LC mixture, three-dimensionally crosslinking the LC mixture, and detaching the film from the substrate.

17. A process for the production of an LC film comprising applying an LC mixture as claimed in claim 4 in the liquid-crystalline state to a smooth substrate, aligning the LC mixture, three-dimensionally crosslinking the LC mixture, and detaching the film from the substrate.

18. A process for the production of LC pigments comprising comminuting an LC film as prepared by the process of claim 14 to give platelet-shaped particles.

19. A process for the production of LC pigments comprising comminuting an LC film as prepared by the process of claim 16 to give platelet-shaped particles.

20. A coating composition comprising LC pigments or LC films of claim 9.

* * * * *